Aug. 21, 1934.    A. G. LEAKE    1,970,965
STRUCTURAL CONNECTION
Filed Nov. 9, 1931    7 Sheets-Sheet 1

Inventor
Arthur G. Leake
By Wooster & Davis
Attorneys

Aug. 21, 1934.   A. G. LEAKE   1,970,965
STRUCTURAL CONNECTION
Filed Nov. 9, 1931   7 Sheets-Sheet 2

Inventor
Arthur G. Leake
By Wooster & Davis
Attorneys

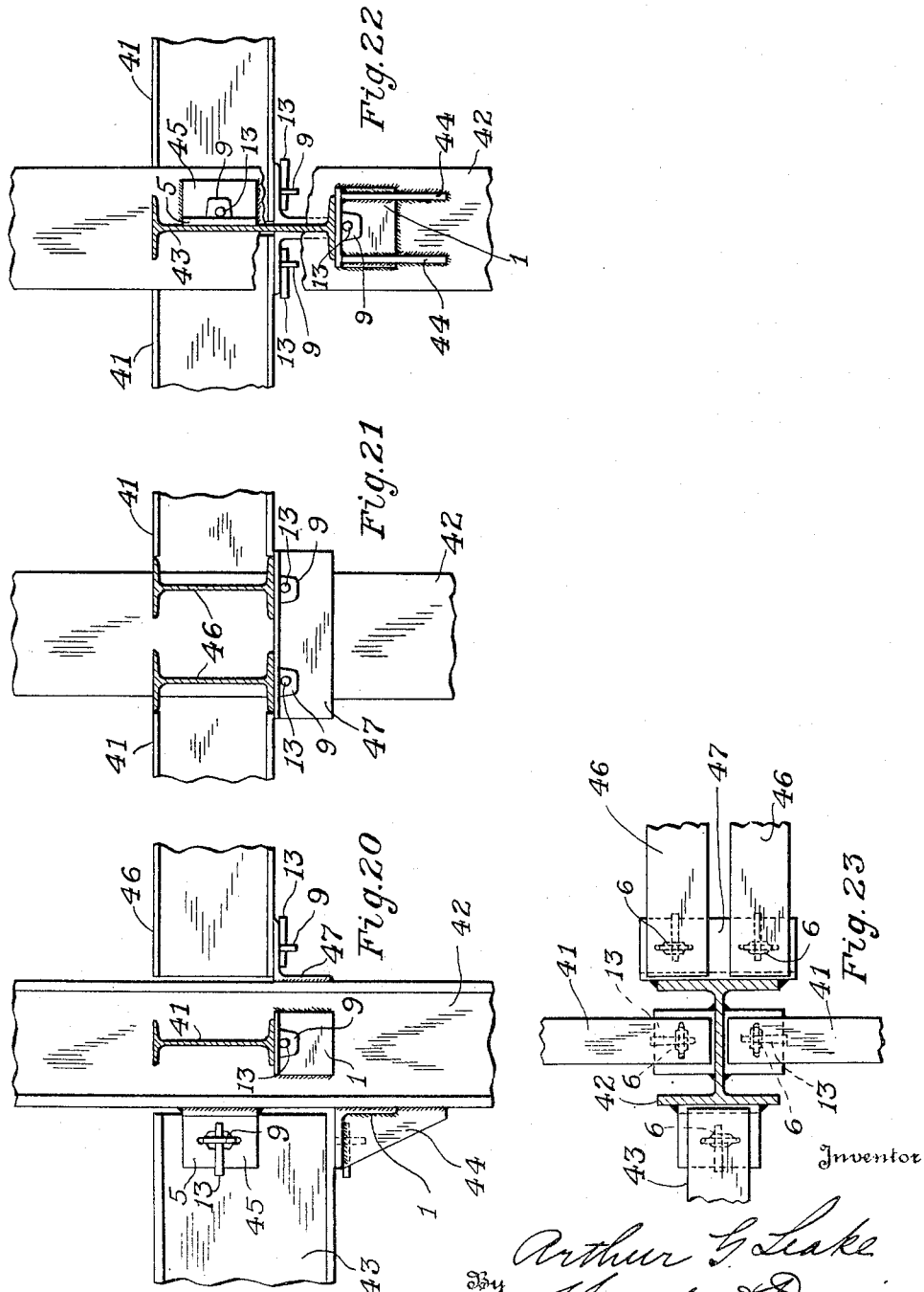

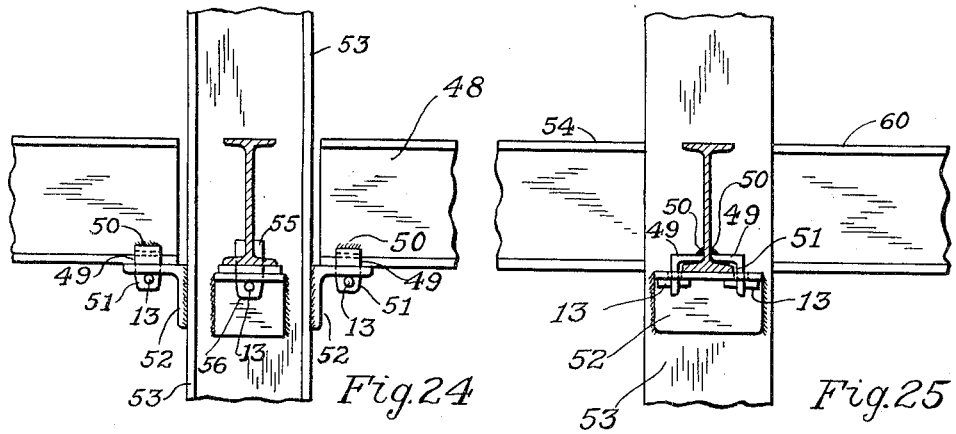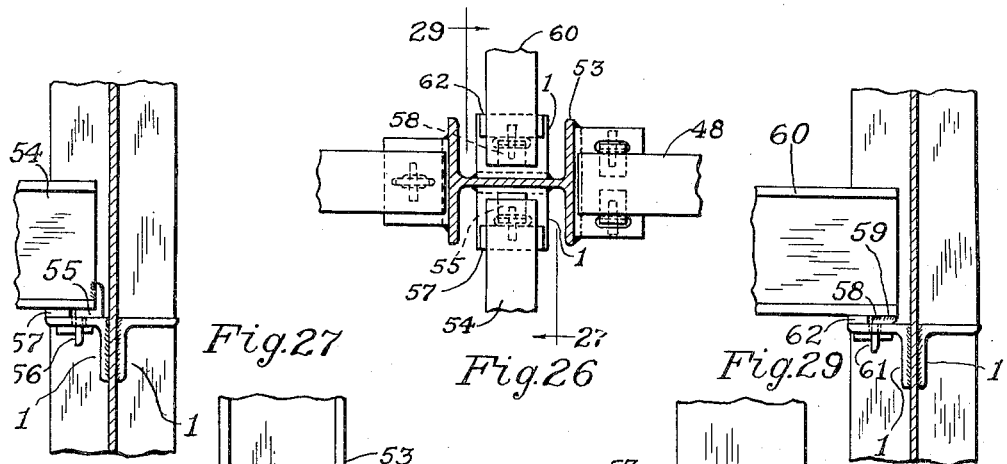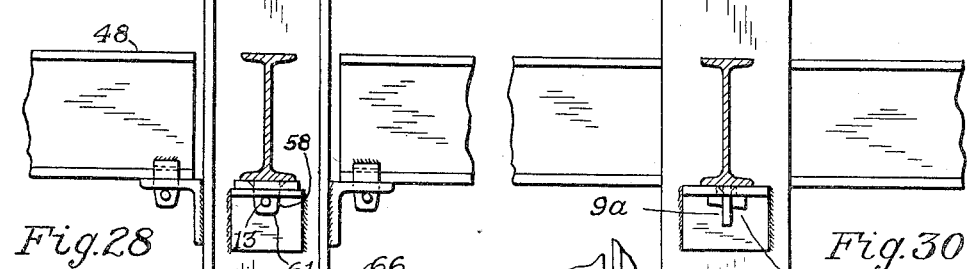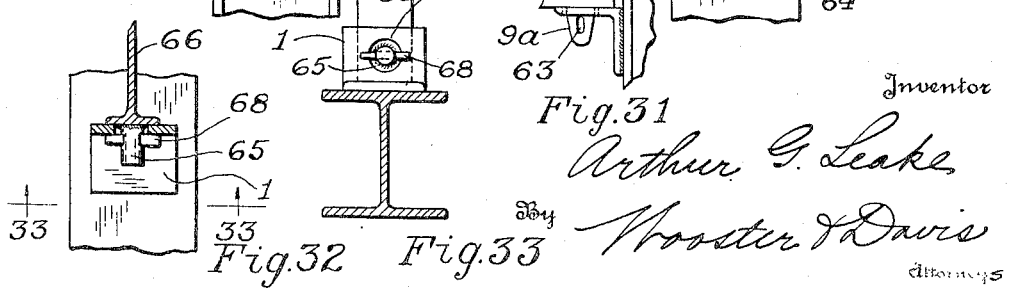

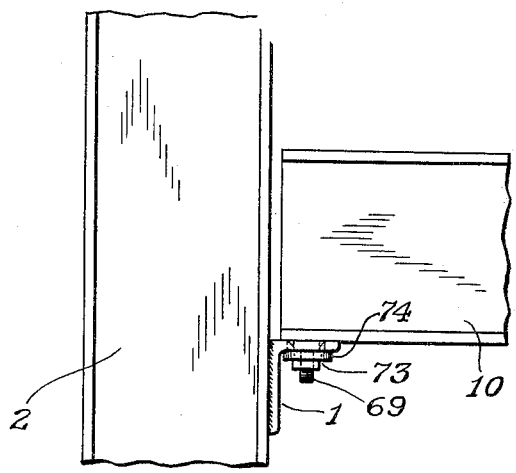
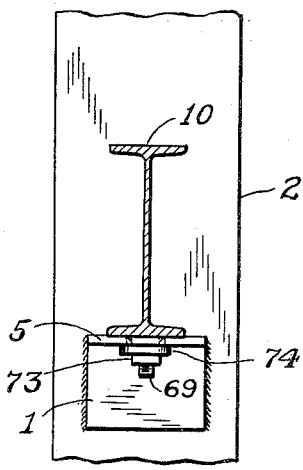
Fig. 34  Fig. 35
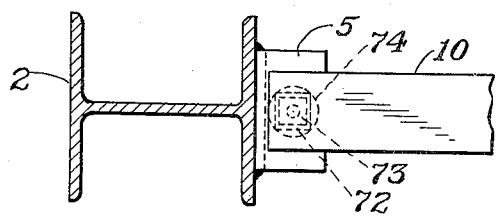
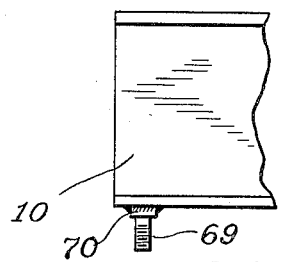
Fig. 36  Fig. 37
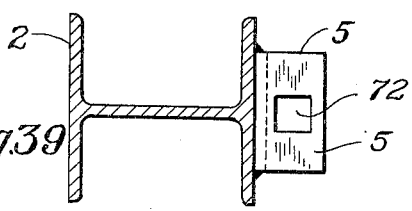
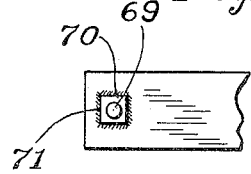
Fig. 39  Fig. 38
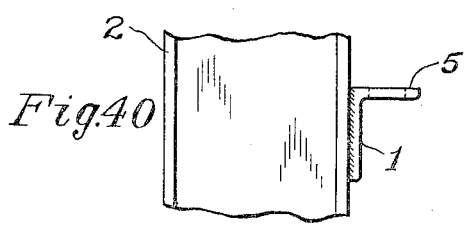
Fig. 40

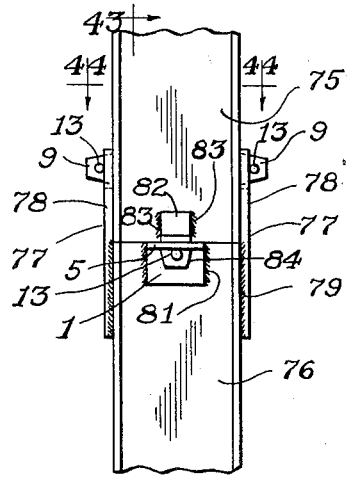
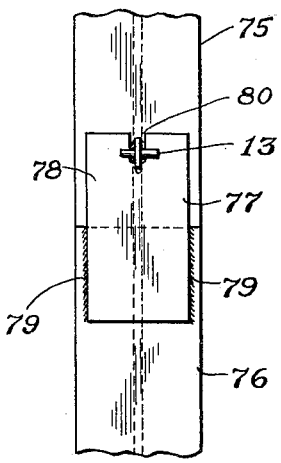
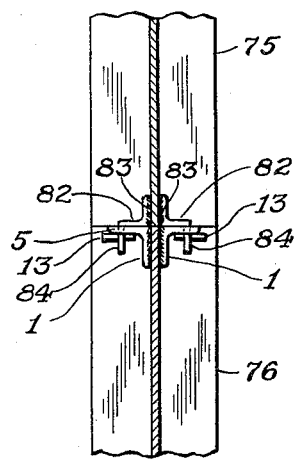
Fig.41  Fig.42  Fig.43
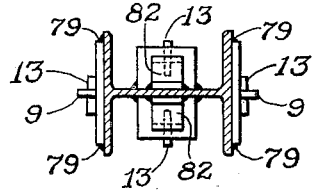
Fig.44
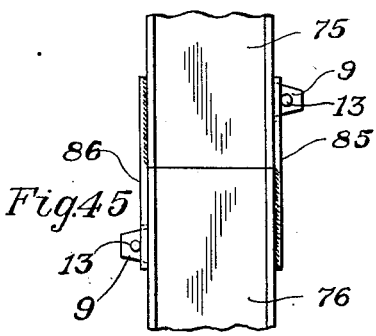
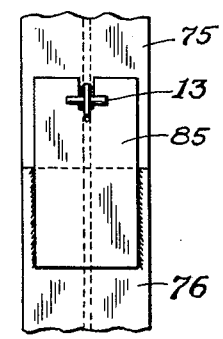
Fig.45  Fig.46
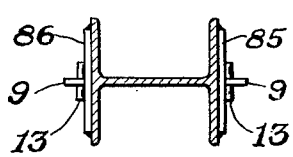
Fig.47
Inventor
Arthur G. Leake
By Wooster & Davis
Attorneys Patented Aug. 21, 1934

1,970,965

UNITED STATES PATENT OFFICE 1,970,965

STRUCTURAL CONNECTION

Arthur G. Leake, Bridgeport, Conn.

Application November 9, 1931, Serial No. 573,888

15 Claims. (Cl. 189—36)

This invention relates to a structural connection for welded structures, particularly a connection for preliminarily connecting the various members of a structural steel structure to securely hold them in proper relation for the final welding operations in completing the fabricating of the structure. A common application is in the fabricating by welding of the structural framing of steel frame buildings and the like, and has for an object to provide an improved securing means for connecting the various elements of the fabricated structure which may be easily and quickly prepared, either in the shop or in the field, and which will securely hold the elements in proper position for the final welding operation.

Another object of the invention is to provide such a connecting means by which the various members may be easily and quickly assembled in the proper relation and securely locked in this relation for the final welding operations.

A further object of the invention is to provide such a connecting means in which, although bolts or rivets may be employed, the various elements may however be attached, and preferably are so attached, by welding so as to eliminate punching, shearing, bolting and riveting operations, and thus eliminating weakening of the various structural members by the punching of holes for rivets or bolts.

With the foregoing and other objects in view, the invention consists in certain novel features of construction and arrangement of parts as will be more fully disclosed in connection with the accompanying drawings in which various applications and methods of using the invention are disclosed, but it is to be understood that still other modifications may be employed without departing from the spirit of the invention.

In these drawings:

Fig. 20 is a side elevation of an interior column of a structural steel building frame indicating how various beams may be secured thereto;

Fig. 21 is a view looking from the right of Fig. 20;

Fig. 22 is a view looking from the left of Fig. 20;

Fig. 23 is a plan view looking down from the top of Fig. 20;

Fig. 24 is a side elevation of an interior column showing a somewhat different construction of a securing means;

Fig. 25 is a view looking from the right of Fig. 24;

Fig. 26 is a view looking downwardly on Fig. 24;

Fig. 27 is a vertical section substantially on line 27 of Fig. 26;

Fig. 28 is a view similar to Fig. 24 showing a somewhat different construction of securing means;

Fig. 29 is a vertical section substantially on line 29 of Fig. 26;

Fig. 30 is a side elevation of a column showing a slightly different locking means;

Fig. 31 is a detail and a side elevation of the connection shown in Fig. 30;

Fig. 32 is a side elevation of a column and section through a somewhat modified securing means;

Fig. 33 is a section substantially on the line 33—33 of Fig. 32;

Fig. 34 is a column and an end of a beam showing a further modified construction of the securing means;

Fig. 35 is a view looking from the right of Fig. 34;

Fig. 36 is a plan view looking downwardly from Fig. 34;

Figs. 37 and 38 are a side elevation and a plan view respectively of the end of the beam in Fig. 34 disconnected from the column;

Figs. 39 and 40 are a horizontal section and a side elevation respectively of a portion of the column in Fig. 34 with the beam removed;

Fig. 41 is a side elevation of a column showing how the invention may be employed to splice the column or to secure two sections thereof together;

Fig. 42 is a view looking from the right of Fig. 41;

Fig. 43 is a vertical section substantially on line 43—43 of Fig. 41;

Fig. 44 is a transverse section substantially on the line 44—44 of Fig. 41;

Fig. 45 is a side elevation of a column similar to Fig. 41 showing a different splicing connection;

Fig. 46 is a view looking from the right of Fig. 45; and

Fig. 47 is a view looking from the bottom of Fig. 45.

Figure 1:
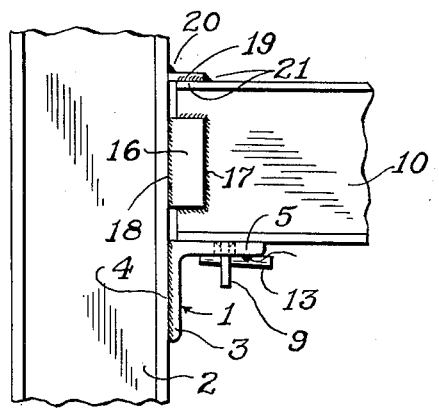
Fig. 1 is a side elevation of a portion of an upright column or supporting element, and the end portion of a horizontal beam or supported element connected thereto according to my invention.

Referring first to Figs. 1 to 8 inclusive, the connection is shown as comprising an angle member 1 forming an angle seat. This is preferably a structural angle member and may be of any size, thickness or length to suit any particular condition or sizes of beam or beams. This angle is ordinarily secured to the supporting member, such as a column 2, but it is equally adapted for securing to other supporting members, such as girders or beams as will be illustrated in other figures of the drawings. It may be attached to the supporting member by various means as by welding, riveting or bolting, but it is preferably welded by welding the edges of the upright flange 3 as indicated at 4, as this welding is less costly and does not require the punching or drilling of holes or the setting of bolts or rivets. Also by welding there are no holes punched in either member to weaken it, and particularly is this an advantage in the case of the supporting member. The free flange or leg 5 of the angle seat member is provided with an opening 6, preferably oblong and somewhat wider at the central portion 7 than at its end portions 8. This opening or slot may be punched or drilled and can be placed parallel with the back of the angle, or at right angles thereto, or in any other direction which is most convenient for the particular connection to be made depending on the position of the lug with which it is to be used, and in some conditions there may be more than one slot and lug as is found desirable.

Figure 2:
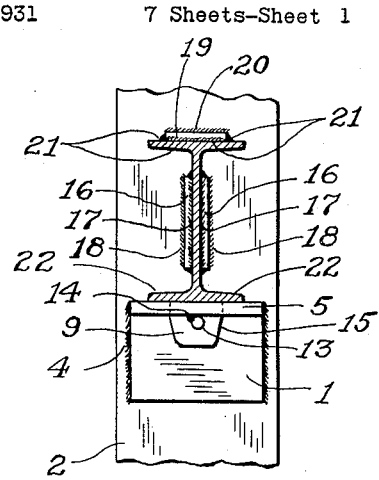
Fig. 2 is a view looking from the right of Fig. 1.
Figure 3:
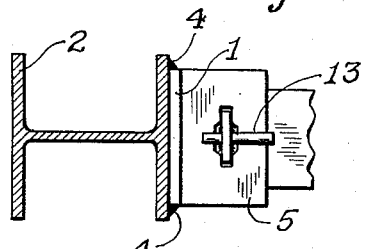
Fig. 3 is a bottom view of Fig. 1.
Figure 4:
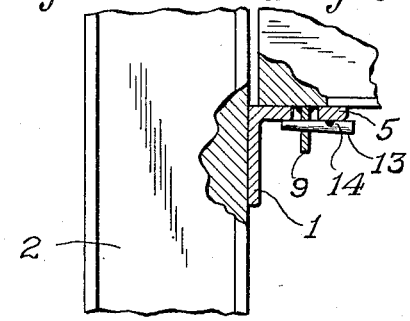
Fig. 4 is a detailed section through the connecting means of Fig. 2 showing the column and beam in side elevation with portions broken away.

The cooperating member comprises a lug 9 secured to the member to be supported, such as a beam 10. Under some conditions the elements may be reversed so that the angle member is on the supported member while the lug is on the supporting member. This lug is preferably welded to the beam as indicated at 11 on opposite sides of one edge thereof so that the lug extends outwardly or downwardly from the surface of the flange of the beam. This lug is provided with a transverse opening 12 which is so located that when the end of the beam is rested on the top flange or leg 5 of the support 1 with this lug extending through the opening 6, this opening 12 will be below or on the opposite side of the leg 5 from the beam 10 as shown in Figs. 1, 2 and 4. Then the members 2 and 10 are locked together by inserting a pin 13 in the opening 12. This pin may be of various shapes such as straight, round, square or oblong in cross section, but is preferably tapered as shown, so that when it is driven into position it will have a certain camming or wedging action and will tightly draw the beam 10 down onto the top of the seat member 1. The pin may be secured in position so that it will not be accidently displaced by means of a spot-weld 14.

Figures 7, 8:
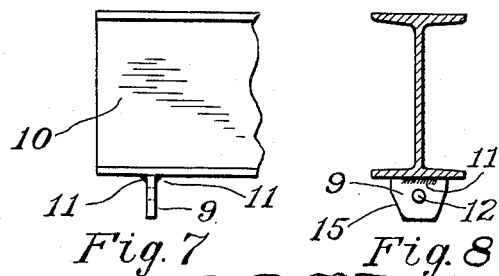
Fig. 7 is a side elevation of the end of the beam or supported member detached from the column or supporting member.
Fig. 8 is a view looking from the right of Fig. 7.

The lug 9 is ordinarily a short plate welded to any beam, channel, girder, or column, either built up or rolled, which is to be supported. The welds 11 are not extended the full width of the lug as indicated in Fig. 8 so that when this lug is in the slot 6, these welds come within the widest portion 7, while the end portions of the lug fit fairly tight in the narrower end portions 8 of the slot. When the beam 10 is placed on the angle seat 1, with this lug 9 in the slot 6, the beam can move only in one direction, and as indicated above when the pin 13 is driven through the opening 12, the beam is securely locked to the supporting member. This simple mounting and securing means comprise the main features of my invention, although it may be employed in a large number of different ways and locations, some of which are illustrated in the other figures of the drawings. Also substantially the structure shown in Figs. 1 to 8 is the preferred construction, although this may be varied somewhat as shown in some of the other figures. To facilitate insertion of the lug 9 in the slot 6 it is preferably tapered somewhat as indicated at 15.

It will be evident in Figs. 1, 2, 3 and 4 that the beam 10 or other member to be supported is securely locked to the supporting member 2 by very simple manipulations, which can be easily and quickly performed, and that the supporting angle seat 1 and the cooperating lug 9 may be secured to their respective members and in their proper locations either in the shop or in the field as is found most desirable. After the members are locked as indicated in Figs. 1 and 2 the final welding operations may be completed with no danger of the beam 10 shifting out of position during these operations, and in mounting the beam 10 on the column 2 in the field it would not be necessary to do any bolting or riveting operation.

The beam 10 may be welded to the column 2 for the permanent connections by any of the standard welding operations. That shown in Figs. 1 and 2 comprises welding the web of the beam to the column by means of plates 16 welded at 17 to the web and at 18 to the column. Also the top flange may be welded by means of a plate or angle 19, which is welded to the column as indicated at 20, and to the flange of the beam as indicated at 21. This is the ordinary manner of welding a beam or similar member to the column 2, but of course, any of the standard welding connections may be used as desired. In completing the welding the edges of the flanges 22 of the beam are also welded to the top of the leg 5, and the free edge of this leg would be welded to the bottom of the flange of the beam, thus completely attaching the member 10 to be supported to the supporting member. The number and arrangement of the new welds after the supported member is locked to the supporting member by my quickly and easily assembled connecting means may be varied as desired.

Figure 5:
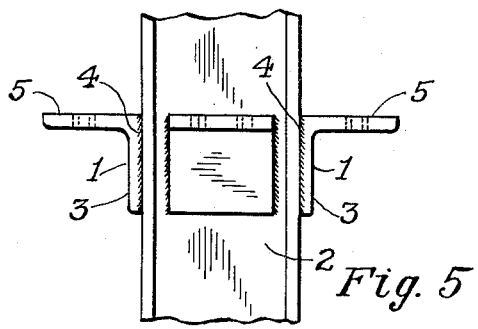
Figs. 5 and 6 are a side elevation and plan view respectively of a column similar to that shown in Fig. 1, and indicating how connections may be made on all four sides thereof.
Figure 6:
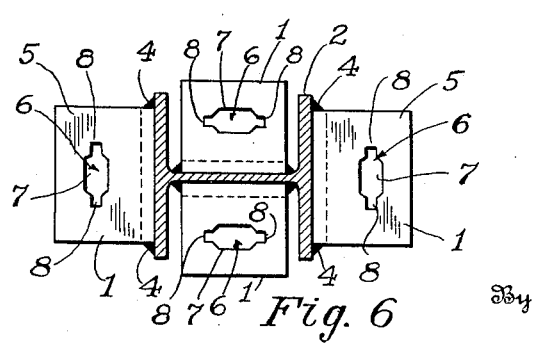

In Figs. 5 and 6 are shown views merely indicating how the supporting seat member 1 may be mounted on either flange or either side of the web of the I-shaped column 2 or on all of these at the same time to indicate that beams may be attached to the column on all four sides.

Referring now to Figs. 9 to 12, I have shown in these figures various arrangements in which my improved securing and locking means may be employed to lock the supported member to the supporting member preparatory to the final welding operation. These final welding operations are however not indicated as they may be, as indicated above, any of the standard welded connections.

Figure 9:
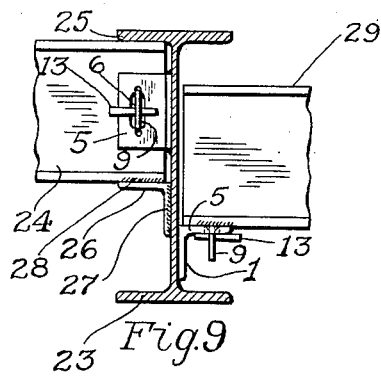
Fig. 9 is a vertical section of a relatively tall beam or girder showing in elevation the ends of other beams extending laterally therefrom, and indicating how they may be connected in different positions according to my invention.
Figure 10:
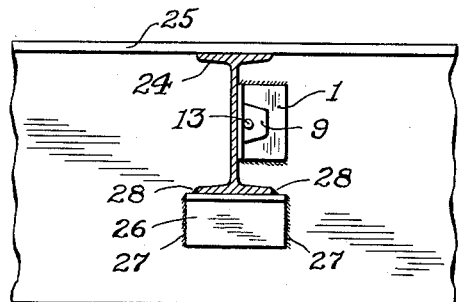
Fig. 10 is a view looking from the left of Fig. 9.

In these Figs. 9 to 12 are shown arrangements where beams are framed into girders as the supporting element instead of a column as in Fig. 1. In these figures the girder is shown as an I-beam 23 of considerable height, and may be a rolled or built up girder or beam as desired, the principle being the same. In Fig. 10 and in the upper left hand end of Fig. 9 is shown how a beam 24 is framed into the girder near the top. In this arrangement because the top of the beam 24 is closely under the top flange 25 of the girder 23, it would not be possible to mount the lug 9 on the under side of the lower flange of the beam as indicated in Fig. 1, because it would not be possible to insert the end of the beam between the angle seat and the flange 25 if this lug were in position. Therefore, a plain angle seat 26 is welded to the face of the web of the girder as indicated at 27, and the beam is welded to the top of this angle as indicated at 28. This seat is welded to the web of the girder with sufficient welding to carry the reaction of the beam, and the angle member 1 is welded to the web of the girder with its leg or flange 5 in the vertical position. The lug 9 is welded to the side of the web of the beam 24, but after it is inserted in the slot 6 in the web 5 and the pin 13 is driven in, the beam is locked to the girder the same as in Fig. 1, and the final welding operations to complete the connection between the girder and the beam may then be completed.

Figure 11:
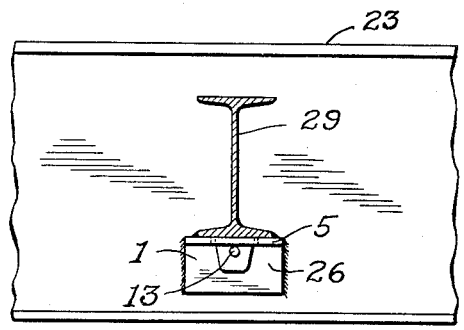
Fig. 11 is a view looking from the right of Fig. 9.

In Fig. 11 and the right hand part of Fig. 9 the beam 29 is shown framed into the girder practically the same as the beam 10 is secured to the column in Fig. 1. In this case there is sufficient room at the top under the top flange of the girder to permit the beam 29 to be lowered into position, and therefore the angle seat 1 is welded to the face of the web of the girder and is used to support the end of the beam 29. The lug 9 is welded to the bottom of the lower flange of this beam and when inserted in the opening in the flange 5 will be held fast when the pin 13 is driven in. The beam 29 will then be securely locked to the girder and will be held in proper position for the final welding operations.

Figure 13:
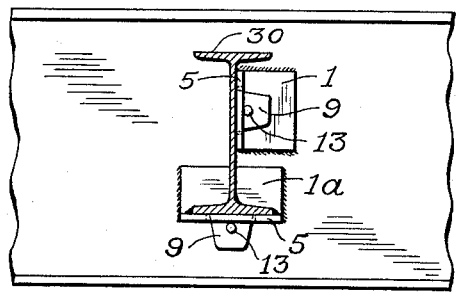
Fig. 13 is a view looking from the left of Fig. 12.
Figure 12:
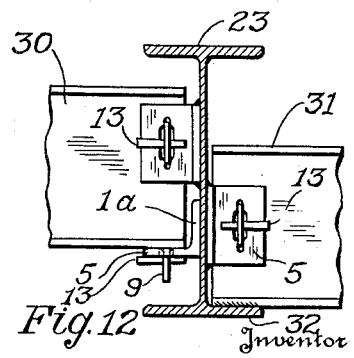
Fig. 12 is a view similar to Fig. 9 showing how the invention is used to connect lateral beams to a main beam or girder in still different locations.
Figure 15:
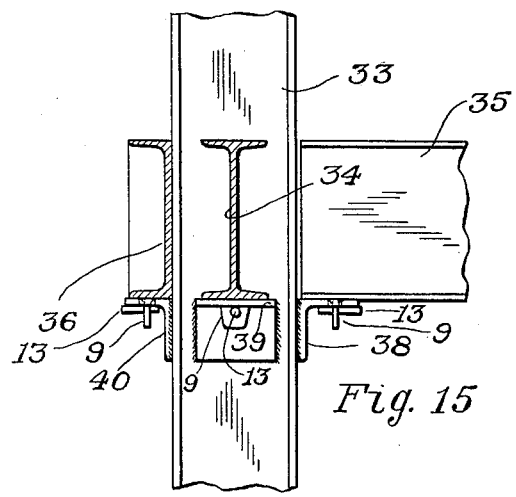
Fig. 15 is a side elevation of a corner column of a structural steel building frame showing how various beams may be connected thereto with my invention, certain other beams being shown in section.
Figure 16:
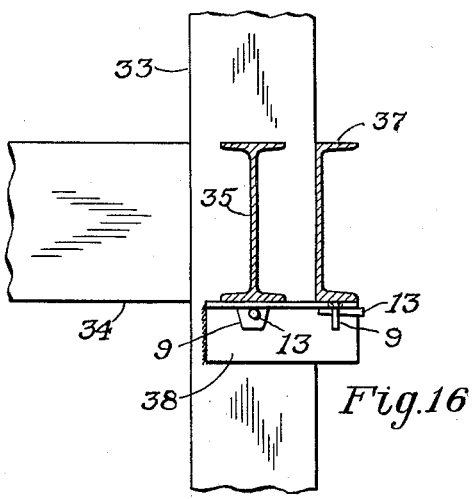
Fig. 16 is a view looking from the right of Fig. 15.
Figure 17:
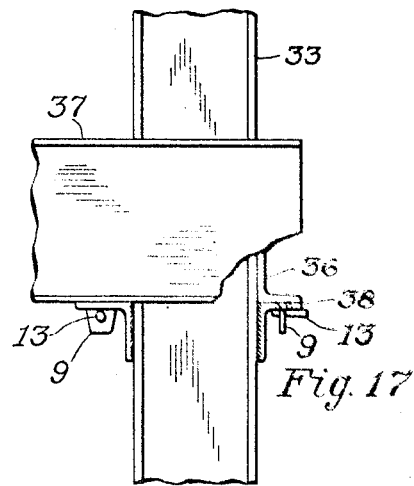
Fig. 17 is a view looking from the right of Fig. 16.
Figure 18:
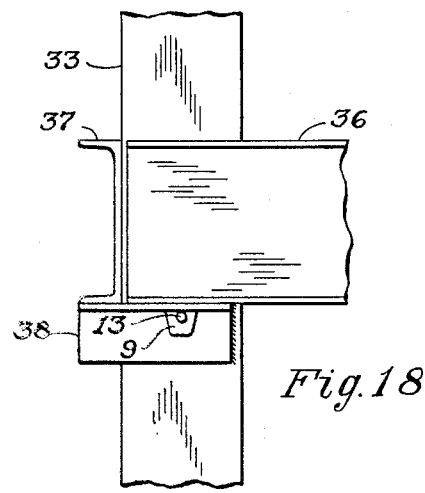
Fig. 18 is a view looking from the left of Fig. 15.
Figure 19:
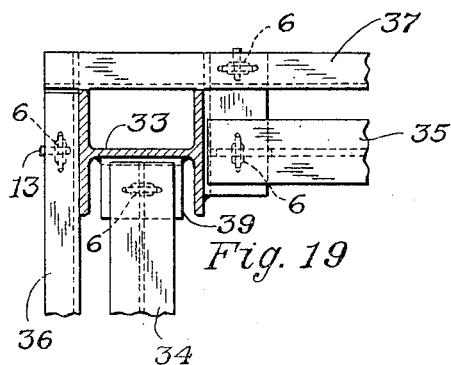
Fig. 19 is a plan view looking downwardly from the top of Fig. 15.

In Fig. 13 and the left hand side of Fig. 12 is shown how this improved locking means is employed where there is not enough room below the beam 30 for the angle seat 1. In this case the angle 1 is welded to the web of the girder by reversing it so that the verticle web or leg 1a of this angle seat extends above the leg 5. The lug 9 welded on the underside of the beam is inserted in the opening in the leg 5 and locked in the same manner as in Fig. 1. If this beam 30 is a high beam it can be secured from rolling over by using the angle seat member 1 welded to the web of the girder with the flange 5 in the upright position, and then locking the beam to it by means of the lug 9 welded to the side of the web of the beam.

Figure 14:
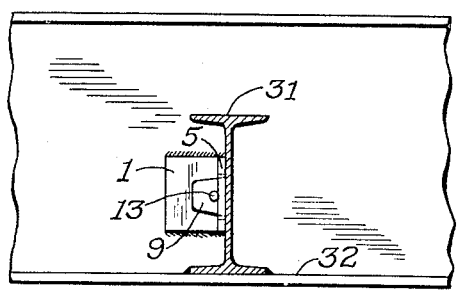
Fig. 14 is a view looking from the right of Fig. 12.

In Fig. 14 and the right hand side of Fig. 12 is shown a beam framed in a girder at the lower part thereof so that the beam 31 rests on the lower flange 32 of the girder. Obviously, there is not room to mount the angle seat 1 and the lug 9 under this beam as in Fig. 1. The angle member 1 is therefore welded to the face of the web of the girder with the leg 5 in a vertical position, and the lug 9 welded to one side face of the web of the beam 31 and locked by the pin 13 in the usual manner. This is somewhat the same as the connection shown in Fig. 10 except that the beam rests on the lower flange of the girder.

In Figs. 15 to 19 are shown how my improved connection can be used for connecting the beams to corner columns as used in building constructions. The same arrangement with slight variations can be used on all exterior columns. In these figures the column 33 is shown as substantially I-shape, and there is used with it a double spandrel beam consisting of I-beam sections 34 and 35 and channel sections 36 and 37. For different conditions the spandrels can be made of either one or more beams or channels, and the beam sections may be either a beam or girder rolled section or built up section, and can, of course, be of more than one beam or girder. Also the channel sections can be either channel or beam rolled sections or built up sections, the principle being the same in all cases, and similar connections may be used for connecting these various beams or girders to the columns. These spandrel beams are used to carry the outside walls of the building as well as their part of the floor load. Sometimes the spandrel is covered with the floor construction and sometimes it is only covered with fire proofing, and the walls and floor rest directly on the spandrel beams. In some cases the beam sections carry rough walls and the floor load and the channel sections carry only the stone facing of the building. In all these constructions the connections can be made in the same manner. As shown in these figures an angle seat member 38 corresponding to the sheet member 1 is welded to one flange of the column and it is of such a length as to project laterally from one side thereof to support the channel 37. It is provided with two of the openings 6, one under the beam 35 to receive the lug 9 on the bottom of this beam, and another under the channel 37 to receive the lug 9 on the underside of this channel, and both the beam 35 and the channel 37 are locked by the pins 13 in the usual manner.

The beam 34, however, is supported and locked by an angle seat 39 secured to the web of the column, while the channel 36 is supported by an angle seat 40 secured to the other flange of the column, and to which it is locked the same way.

It is to be understood in all of these cases after the beams and channels are locked to the column they are welded by any of the usual welded connections.

In Figs. 20 to 23 are shown how beams may be framed into an interior column on all four of its faces, but of course, the same connections may be used if a beam or beams are framed into only one, two or three faces of the column.

At 41 are shown medium sized beams framed into the opposite sides of the web of the column 42. The necessary strength to carry the reaction of these beams is taken care of by the angle seat members 1 welded to the opposite faces of the web and the beams locked to these angle members the same as shown in Fig. 1.

At 43 is shown a larger beam resting on angle seat member 1 welded to a flange of a column, but if in this case it is not possible to do sufficient welding between this angle seat and the column to carry the load, stiffeners 44 can be welded under this angle seat to give it the required strength. These are preferably tapered stiffener plates welded at their edges to the column and strengthening the angle seat as shown. In this case as the beam 43 is a high beam and therefore there may be danger of its rolling over, it may be securely locked in this upright position by welding an angle seat member 45 corresponding to member 1 to the flange of the column with the web 5 extending vertically, and then lock the web of the beam to it in the same manner as shown in Fig. 13.

On the right hand side of this column as indicated in Fig. 23 is shown a construction which requires a double girder. Thus there is shown two I-beam girders 46, and the angle seat member 47 welded to the flange of the column is of sufficient length to accommodate both of these beams. It will be understood that in this case the upper flange of this seat member is provided with a slot 6 under each beam 46 to which the lugs 9 welded to the underside of these beams are locked in the usual manner. If desired the stiffeners 44 can be used to help support this angle seat member the same as is used for the girder member 43 on the other side of the column.

In Figs. 24 to 33 are shown various somewhat modified connections which can be used. Thus as shown in Fig. 25 and at the right hands of Figs. 24 and 26, instead of a plain lug 9 welded to the underside of the beam 48 to be supported this lug can take the form of one or more angle members 49 welded to the web of the beam as indicated at 50 with the other web of the angle indicated at 51 extending downwardly below the beam and provided with openings to receive the locking pin 13. It is to be understood that these webs 51 pass through elongated openings in the top flange of the angle seat member 52 welded to the column 53 the same as would a plain lug 9 if it were used.

In Fig. 27 and the central portion of Fig. 26 the beams 54 are secured to the column by means of Z-bars 55 welded to the beams 54 and with the lower flanges 56 extending downwardly through openings in the supporting seat member 1 and locked in the usual manner. Filler plates 57 may be inserted between the beams and the top of the angle seat member and welded in position to fill up the space between them.

In Fig. 29 a somewhat similar connection is used, but here instead of Z-bars, angle bars 58 are welded at 59 to the undersides of the beams 60 with their other flanges 61 extending through the angle seats 1, and locked as in the other forms. Here the filler plates 62 are used of a thickness corresponding to the flange of the members 58 to fill in the space between the beams and the angle seat.

In Figs. 30 and 31 the connection is substantially the same as in Fig. 1 except that instead of using a round hole 12 and a round pin, the lug 9a is provided with a vertically elongated slot 63 and a flat tapered pin 64 is used as the locking element.

In Figs. 32 and 33 instead of a flat lug, a round stud 65 is welded to the underside of the beam 66 and passes through an opening in the seat member 1. This opening instead of being an elongated slot may be a round hole 67 and the elements are locked by the transverse pin 68 extending through an opening in the stud 65.

In Figs. 34 to 40 is shown still another modification. In these figures the angle seat 1 is secured to the column 2 the same as in Figs. 1 to 4, but instead of a flat lug being secured to the underside of the beam 10, a threaded stud 69 forms this lug. It is preferably provided with a head 70, either round or square, which is welded to beam 10 as shown in 71. The leg 5 of the angle member 1 is provided with an opening 72 of sufficient size to accommodate the head of the stud and the weld. After insertion through this opening the stud may be locked by means of a nut 73 clamping against the washer 74.

In Figs. 41 to 47 I have shown how the principles of this securing means may be employed for splicing two sections of a column or beam.

Thus in Figs. 41 to 44 the column comprises an upper section 75 and a lower section 76, the lower end of the upper section resting on the upper end of the lower section. To the flanges of one of the sections, in the present instance the lower section 76, are welded plate members 77 corresponding to the angle members 1, but instead of being angle members are straight so that the free portion 78 extends along the surface of the flange of the upper section 75, the attached portion being welded to the section 76 as indicated at 79. The free portion 78 has an opening 80 which may open through the top end thereof to facilitate insertion of the lug 9 welded to the flange of the section 75, or it may be spaced from this end. The sections are locked by the pins 13 the same as in the other forms. It will, of course, be understood the same splicing can be used for horizontal beams.

Additional securing means may be provided for the two section members of the columns if desired, as when the columns or beams are very long and heavy. Thus angle members 1 may be welded to the web of the lower section as indicated at 81 and then Z-members 82 may be welded to the web of the upper section as indicated at 83 with the free flanges 84 thereof extending downwardly through the openings in the free flanges 5 to be locked by the pins 13 in the usual manner.

In Figs. 45, 46 and 47 the construction is the same except that instead of welding the attached portion of both plate 77 to the lower section 76 of the column and both lugs 9 to the upper section as in Fig. 41, one section 85 is welded to the lower section 76, while the other element 86 is welded to the upper section 75. The lug 9 for locking to the element 85 is welded to the upper section 75, while the lug 9 for locking to the member 86 is welded to the lower section 76.

It will be noted that in all of the various modification shown the principle is the same, and that the supporting seat member and the locking lug member can be attached to their respective members either in the field or in the shop. They are preferably attached by welding as this eliminates punching and drilling of rivet holes with the consequent increased cost and necessary weakening of the members so punched or drilled, but in such cases where such punching and drilling is not objectionable and welding apparatus may not be available, the seat member and the locking lug, but more particularly the seat member, may be attached by bolts or rivets. In all cases the supporting member and the supported member are securely attached or locked together in proper relative position by a very simple operation, and they are securely held in proper position for the final welding operations. This construction greatly facilitates the erection of the steel framing and permits its erection in much less time. Also as the elements are securely held in the proper relation, more accurate and better connections can be made and much more quickly than by the old method, and where welding is employed there is no weakening of the structural members.

Having thus set forth the nature of my invention, what I claim is:

1. A preliminary connection for welded building structures including a supporting member and a supported member, comprising an angle member having one flange welded to the face of the supporting member with the other flange extending outwardly therefrom and provided with an opening, a lug welded to the supported member passing through said opening, and means for locking the lug to said flange with a face of the supported member against the flange.

2. A preliminary connection for welded structural steel structures including a supporting member and a supported member, comprising an angle seat having one flange welded to the face of one of said members and the other flange extending outwardly therefrom and provided with an opening, a lug welded at one end to the other member and passing through said opening, said lug having a transverse opening on the opposite side of the flange from said member, and means in said latter opening for locking the lug to the flange with the face of the supported member against the flange.

3. A preliminary connection for welded structural steel structures including a supporting member and a supported member, comprising an angle seat having a flange welded in an upright position against a face of the supporting member with the other flange extending horizontally therefrom and provided with an opening, the other member resting on said latter flange, a lug welded to the other member and extending through said opening in the flange, and means for locking the lug to the flange with the face of the member against the flange.

4. A preliminary connection for welded structural steel structures including a supporting member and a supported member, comprising an angle seat having a flange welded in an upright position against a face of the supporting member with the other flange extending horizontally therefrom and provided with an opening, a lug welded to the other member extending through said opening in the flange with said member resting on the flange, and said lug provided with a transverse opening under the flange, and a pin in said latter opening to lock the members together.

5. A preliminary connection for welded structures including a supporting member and a supported member, comprising a supporting element connected to one of the members and having an oblong opening therein, an oblong lug secured to a surface of the other member to extend outwardly therefrom by welds at the opposite sides of the lug, the opening in the supporting element being of a width at its opposite ends to hold said lug and wider at its central portion to accommodate said welds, and means passing through the lug to lock the members together.

6. A preliminary connection for welded structural steel structures including a supporting member and a supported member, comprising an angle seat having one flange secured to the face of one of said members and the other flange extending outwardly therefrom and provided with an oblong opening, an oblong lug welded at opposite sides of one edge to the other member to extend outwardly therefrom, said opening being of a width at its opposite ends to receive said lug and wider at its central portion to accommodate the welds, and means extending through the lug to lock it to the flange.

7. A preliminary connection for welded structural steel structures including an upright supporting member and a laterally extending supported member, comprising an angle having an upright flange welded along its edges to an upright surface of the supporting member with its other flange extending laterally therefrom and provided with an oblong opening, an oblong lug welded at one edge to the other member to extend outwardly therefrom and passing through said opening with the laterally extending member resting against said flange, said lug having an opening on the opposite side of the flange from said member, and means in said opening for locking the members together.

8. A preliminary connection for welded building structures including a supporting member and a supported member, comprising an angle bracket consisting of two flat flanges at substantially right angles to each other, one of said flanges being welded to a face of one of the members and the other flange having an opening therethrough, a lug welded to a face of the other member and extending outwardly therefrom, said lug extending through the opening in the flange, and means on the opposite side of the flange from the member to which the lug is welded for locking the lug to the flange to secure the two members together.

9. A preliminary connection for welded building structures including a supporting member and a supported member, comprising an angle member consisting of two flat flanges at substantially right angles to each other, one of said flanges being welded to a face of the supporting member with the other flange extending outwardly therefrom, said latter flange having an opening therethrough, a lug welded to a face of the supported member and extending through said opening, and means on the opposite side of the flange from said member for locking the lug to the flange.

10. A preliminary connection for welded building structures including connected members, comprising a connecting element welded to one of the members and having a flat portion resting against a wall of the other member, said portion of the element having an elongated opening therethrough, an oblong lug welded to the other member of a width substantially equal to the length of the opening and extending through said opening, said lug having a transverse opening therein on the opposite side of the element from the member to which the lug is connected, and a locking pin in the latter opening to lock the members together.

11. A preliminary connection for welded building structures including an upright supporting member and a laterally extending supported member, comprising an angle bracket having a pair of flat flanges extending at substantially right angles to each other, one of said flanges being welded at its edges to an upright surface of the first member and with the other flange extending outwardly therefrom, said latter flange having an opening therethrough, a lug welded to a surface of the second member and extending outwardly therefrom, said second member resting directly on said second flange with the lug extending through the opening in the flange, said lug having a transverse opening therethrough on the opposite side of the flange from the member, and a locking pin driven in said opening to lock the members together.

12. A preliminary connection for welded building structures including a supporting member and a supported member, comprising a supporting element welded to a face of one of the members and having an outwardly extending flange provided with an elongated opening therethrough, an oblong lug welded to the other member having a transverse opening therein and having its side edges tapered toward its free end, said lug extending through the opening in the supporting element with its opening at the opposite side of the flange, and a securing pin passing through the opening in the lug to lock the members together.

13. A preliminary connection for welded building structures including a supporting member and a supported member, comprising a supporting element welded to a face of one of the members and having an outwardly extending flange provided with an elongated opening therethrough, an oblong lug of a width substantially equal to the length of said opening and welded to the other member, said lug having a transverse opening therethrough, said lug extending through the opening in the supporting element with its opening at the opposite side of the flange, and a securing pin passing through the opening in the lug to lock the members together.

14. A preliminary connection for welded building structures including an upright supporting member and a lateraly extending supported member, comprising an angle member having flat flanges extending at substantially right angles to each other, one of said flanges being welded at its edges to a surface of the upright member with the other flange extending outwardly therefrom, said latter flange having an elongated opening therein, an oblong lug welded to a surface of the supported member and extending outwardly therefrom, said second member resting against said latter flange with the lug extending through the opening, said lug having a transverse opening on the opposite side of the flange from the second member, and a pin in said opening for locking the members together.

15. A preliminary connection for welded building structures including a supporting member and a supported member, comprising a bracket welded to an upright wall of the supporting member and extending outwardly therefrom, said bracket having an elongated opening extending substantially parallel to said wall, and an oblong lug welded to the bottom wall of said supported member and extending into said opening to lock the members together and to support the second member on the bracket.

ARTHUR G. LEAKE.